Aug. 12, 1947. W. H. RICHARDS 2,425,344
REEL
Filed Dec. 18, 1945
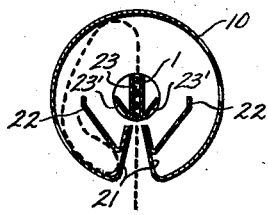
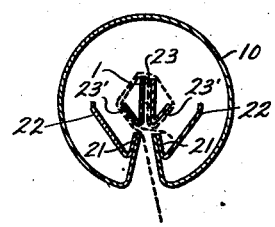
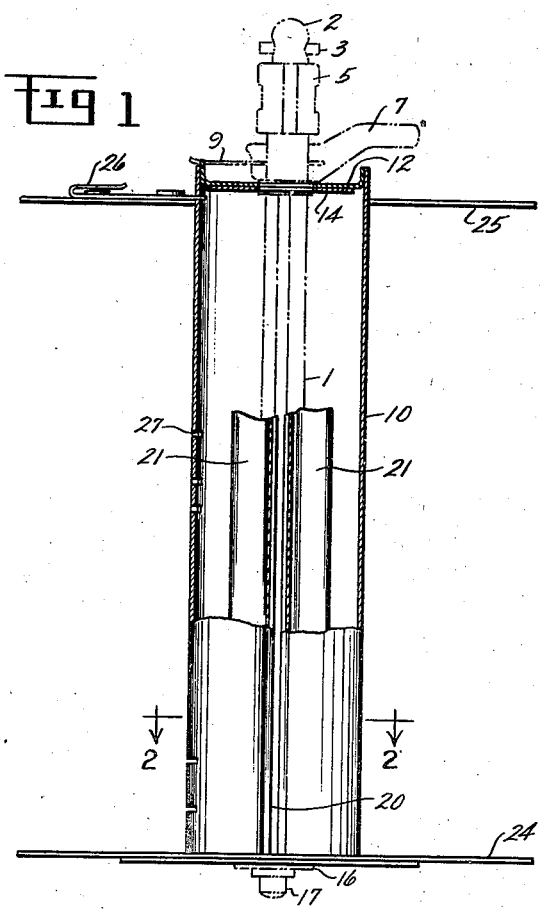
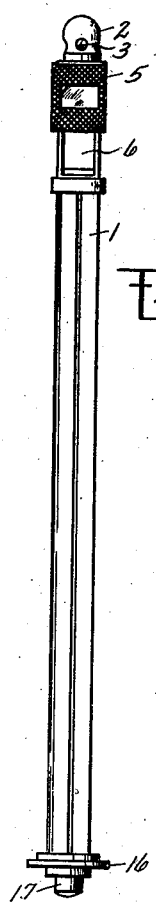
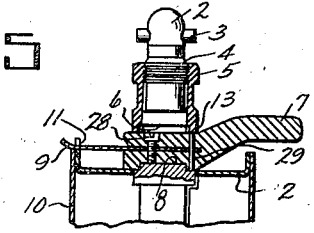
INVENTOR.
WILLIAM H. RICHARDS
BY Patented Aug. 12, 1947

2,425,344

UNITED STATES PATENT OFFICE 2,425,344

REEL

William H. Richards, Dayton, Ohio

Application December 18, 1945, Serial No. 635,815

5 Claims. (Cl. 242—74)

(Granted under the act of March 3, 1883, as amended April 30, 1928; 370 O. G. 757)

The invention described herein may be manufactured and used by or for the Government for governmental purposes without payment to me of any royalty thereon.

This invention relates to a reel for roll film developing device and the like, such as described in an application for Letters Patent Serial No. 636,042, filed by me on December 19, 1945, on a roll film developing device.

An object of this invention is to provide a reel for developing roll film of varying sizes.

It is another object of this invention to provide a reel for developing flexible material, such as roll film, having a novel means for locking one end of the film on the reel to provide a firm grip on the film preventing its release from the reel while the film is being developed.

In the development of roll film by use of the roll film developing device hereinabove referred to or similar devices, the film is repeatedly wound and rewound from one reel to another, while immersed in the fluid of the developing tanks, at a high rate of speed, causing considerable strain on the film, when one reel has been entirely unwound, which strain continues until the reversing mechanism functions and the winding process again commenced. It is an object of this invention to provide a reel for developing roll film having a novel construction providing a strong grip on the film which will prevent tearing or dislodging of the film from the reel when the wind is reversed.

Another object of this invention is to provide a reel of the character described having a novel locking means for holding the reel and shaft in engagement during the developing process but which may be readily moved out of engaged relation and the shaft and reel separated.

The above and other objects will be apparent from the following description and illustrated in the accompanying drawings, wherein Fig. 1 is an elevational sectional view of the reel assembly;

Fig. 2 is a cross-sectional view of the reel and shaft taken on the line 2—2 of Fig. 1, showing the film threaded into the reel assembly;

Fig. 3 is the same view shown in Fig. 2, showing the film locked in the reel assembly;

Fig. 4 is a longitudinal view of the reel shaft; and

Fig. 5 is a side view of the locking device, in section, mounted on the shaft and in engagement with the reel.

Referring now more particularly to the drawings, the numeral 1 designates the drive shaft having the dome shaped head 2. A pin 3 is mounted on the head 2 to receive the drive shaft head of a driving mechanism (not shown). The upper end of the shaft 1 has the longitudinal aperture 6 through which the locking member 7 is inserted. The outside walls of the shaft adjacent said aperture are squared to permit the hood 5 to pass freely over said portion of the shaft. The locking member 7 has a notch on its lower surface adapted to receive the shaft 1 at the floor of the aperture 6 and said locking member also has an extension 9 consisting of a narrow, preferably metal, band fixedly mounted in the locking member 7 by means of the screw 28 and pin 29, extending beyond the hub of the reel 10 and adapted to fit in a notch 11 in the reel collar 12. The hood 5 has the downwardly extending abutment 13 which, when the hood 5 is screwed down into locking position against the locking member 7, abuts the upper surface of said locking member 7 and holds same in locked position. When it is desired to disengage the reel and shaft, the hood 5 is screwed upwardly and the abutment 13 thus moved out of engagement with the locking member 7, clearing the aperture 6 sufficiently to permit the notch 8 of the locking member 7 to be moved out of engagement with the shaft 1 and the locking member withdrawn from the aperture 6. The reel 10 is closed by end walls 14, 15 in the opposing ends thereof having axial channels in which the shaft 1 is mounted, the flange 16, mounted on the shaft 1, limiting the vertical movement of the shaft in the reel 10. The shaft 1 has the axial extension 17 on the lower end thereof which has a bearing surface and rests in an indentation in the floor of the roll film developer (not shown).

The reel 10 has the longitudinal aperture 20 extending from the collar 12 to the opposing end of the reel, the walls of said aperture extending inwardly gradually reducing the width of the aperture and forming the film guard 21, 21, which are constructed of thin metal bands having the laterally extended wings 22, 22.

A portion of the shaft 1 forms the core of the reel 10 and said portion of the shaft is shaped to provide a narrow transversely extending passageway 23 and a pair of lateral wings 23', 23' extending from the opening of the passageway 23.

The film to be developed is threaded through the aperture 20 and passageway 23 and forced into the reel 10 until it is stopped by the guard 21 as shown in dotted lines in Fig. 2. The nature of the film, due to its wind on the camera film spool, is to curl. The wing 22 prevents the film from curling within the reel. After the film is inserted into the reel, the shaft 1 is manually rotated one complete revolution, wrapping the film around the drive shaft locking the film within the reel as shown in dotted lines in Fig. 3.

Fixedly mounted on the reel 10 is the film guide 24 and loosely mounted on the reel 10 is the film guide 25, said guide 25 being axially movable to various positions on the reel to accommodate films of different width and the guide 25 is held in the desired position on the reel by a suitable number of slidably mounted friction fasteners 26, one end of which fits into apertures 27 in the reel wall. There may be any desired number of said apertures in order that the guide 25 may be secured at the desired position on the hub of the reel.

In developing film in the roll film developing device above referred to where the present invention is used it is essential that the film be properly aligned on the shaft 23 and maintained in said alignment during the developing process. The adjustable film guide 25 provides a means for such alignment by permitting the guide 25 to be moved to a position and locked on the hub of the reel in accordance with the size of the film, thus assuring a straight alignment of the film within the shaft and means for maintaining said alignment.

Having thus described my invention, what I claim as new and desire to secure by Letters Patent of the United States is:

1. A winding reel for receiving a flexible material such as photographic film and the like comprising a hollow hub member, radially extending guide members secured to said hub member, a longitudinally extending aperture in said hub member for receiving the material to be wound, a driving shaft extending through the hub member and rotatable relative thereto, a slot extending longitudinally of said drive shaft and adapted to be brought into register with the aperture in the hub member to receive the material to be wound and to cause the same to wrap around the drive shaft upon rotation of the shaft relative to the hub and means for clutching the drive shaft in positive driving relation to the hub member.

2. A winding reel for receiving a flexible material such as photographic film and the like comprising a hollow hub member, radially extending guide members secured to said hub member, a longitudinally extending aperture in said hub member for receiving the material to be wound, said aperture having inwardly extending side walls, laterally extending wings on said side walls adapted to prevent the curling of the material within the hub, a driving shaft extending through the hub member and rotatable relative thereto, a slot extending longitudinally of said guide shaft and adapted to be brought into register with the aperture in the hub member to receive the material to be wound and to cause the same to wrap around the driving shaft upon rotation of the shaft relative to the hub, and means for clutching the drive shaft in positive driving relation to the hub member.

3. A winding reel for receiving a flexible material such as photographic film and the like comprising a hollow hub member, radially extending guide members secured to said hub member, one of said guide members being mounted to move axially on said hub, means for securing said movable guide member at the desired position on the hub, a longitudinally extending aperture in said hub member for receiving the material to be wound, a driving shaft extending through the hub member and rotatable relative thereto, a slot extending longitudinally of said drive shaft and adapted to be brought into register with the aperture in the hub member to receive the material to be wound and to cause the same to wrap around the guide shaft upon rotation of the shaft relative to the hub and means for clutching the driving shaft in positive driving relation to the hub member.

4. A winding reel for receiving a flexible material such as photographic film and the like comprising a hollow hub member radially extending guide members secured to said hub member, a longitudinally extending aperture in said hub member for receiving the material to be wound, a drive shaft extending through the hub member and rotatable relative thereto, a slot extending longitudinally of said shaft and adapted to be brought into register with the aperture in the hub member to receive the material to be wound and to cause the same to wrap around the drive shaft upon rotation of the shaft relative to the hub, said shaft having laterally extended arms providing an irregular wrapping surface and means for clutching the drive shaft in positive driving relation to the hub member.

5. A winding reel for receiving a flexible material such as photographic film and the like comprising a hollow hub member radially extending guide members secured to said hub member, a longitudinally extending aperture in said hub member for receiving a material to be wound, a driving shaft extending through the hub member and rotatable relative thereto, an axial extension on said drive shaft having an aperture therein, a locking member adapted to be received by said last mentioned aperture for maintaining said hub member and said drive shaft in driving relation, means for maintaining said locking member in locking relation, a slot extending longitudinally of said drive shaft and adapted to be brought into register with the longitudinally extending aperture in the hub member to receive the material to be wound and to cause the same to wrap around the drive shaft upon rotation of the shaft relative to the hub.

WILLIAM H. RICHARDS.

REFERENCES CITED

The following references are of record in the file of this patent:

UNITED STATES PATENTS

| Number | Name | Date |
|---|---|---|
| 1,663,923 | Shutt | Mar. 27, 1928 |
| 2,390,894 | Morse | Dec. 11, 1945 |

FOREIGN PATENTS

| Number | Country | Date |
|---|---|---|
| 1,617 | Great Britain | Jan. 7, 1915 |
| 503,552 | Great Britain | Apr. 11, 1939 |